(12) United States Patent
Jeon et al.

(10) Patent No.: US 8,159,630 B2
(45) Date of Patent: Apr. 17, 2012

(54) BACKLIGHT ASSEMBLY AND LIQUID CRYSTAL DISPLAY

(75) Inventors: Jae-Hwan Jeon, Suwon-si (KR); Jung-Soo Ok, Suwon-si (KR); Jeong-Ki Kim, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 316 days.

(21) Appl. No.: 12/606,141

(22) Filed: Oct. 26, 2009

(65) Prior Publication Data

US 2010/0188595 A1    Jul. 29, 2010

(30) Foreign Application Priority Data

Jan. 28, 2009  (KR) .................. 10-2009-0006667

(51) Int. Cl.
  *G02F 1/1335* (2006.01)
(52) U.S. Cl. ......................................... 349/58
(58) Field of Classification Search ............... 349/58
  See application file for complete search history.

(56) References Cited

U.S. PATENT DOCUMENTS

| | | | |
|---|---|---|---|
| 6,545,732 B2 * | 4/2003 | Nakano | 349/58 |
| 7,586,557 B2 * | 9/2009 | Fang et al. | 349/58 |
| 2007/0047265 A1 * | 3/2007 | Kang et al. | 362/634 |
| 2007/0153155 A1 * | 7/2007 | Chung et al. | 349/58 |

FOREIGN PATENT DOCUMENTS

| | | |
|---|---|---|
| KR | 1020010019450 A | 3/2001 |
| KR | 1020070080276 A | 8/2007 |
| KR | 1020080053826 A | 6/2008 |

* cited by examiner

*Primary Examiner* — James Dudek
(74) *Attorney, Agent, or Firm* — Innovation Counsel LLP

(57) ABSTRACT

A backlight assembly and a liquid crystal display which may provide improved reliability are disclosed, in accordance with embodiments of the present invention. The backlight assembly includes, in one embodiment, a light guide plate guiding light, and a lamp unit positioned on one side of the light guide plate. The lamp unit includes first and second lamps extending in parallel to each other in a first direction, and a first holder having a body fixing the first and second lamps and a projection part projected from the body and between the first and second lamps. The backlight assembly includes a lower receptacle accommodating the light guide plate and the lamp unit therein.

19 Claims, 11 Drawing Sheets

BACKLIGHT ASSEMBLY AND LIQUID CRYSTAL DISPLAY

CROSS-REFERENCE TO RELATED APPLICATIONS

This application claims priority to and the benefit of Korean Patent Application No. 10-2009-0006667, filed on Jan. 28, 2009, in the Korean Intellectual Property Office, the disclosure of which is incorporated herein by reference in its entirety.

BACKGROUND

1. Technical Field

The present invention relates to a backlight assembly and a liquid crystal display and, more particularly, to a backlight assembly and a liquid crystal display which may provide improved reliability.

2. Related Art

A liquid crystal display (LCD), which is a widely used type of flat panel display (FPDs), includes two substrates, on which electrodes are formed, and a liquid crystal layer interposed between the two substrates. In such a LCD, liquid crystal molecules of the liquid crystal layer can be rearranged in accordance with voltages applied to the electrodes, and thus, a quantity of light passing through the liquid crystal layer can be adjusted.

The LCD is a passive self-luminous device and includes a liquid crystal panel for displaying an image and includes a backlight assembly for supplying light to the liquid crystal panel. The backlight assembly includes lamp parts, and in reference to the reliability of the LCD, it is important to maintain the spacing among a plurality of lamps that constitute the lamp part.

Recently, with the general trend toward a slim LCD, the size of a backlight assembly has become thinner. Accordingly, the space among the lamps of the lamp part included in the backlight assembly has narrowed. As the space among the lamps is narrowed, an interaction may occur among the lamps in accordance with an environment in which the LCD is used. As such, the lamps may be damaged with the luminance of the LCD deteriorated, and thus, the reliability of the LCD may be reduced.

SUMMARY

As provided herein, embodiments of the present invention may overcome the deficiencies of the conventional art. An embodiment of the present invention may provide a backlight assembly that is minimally influenced by the use environment of a liquid crystal display and, thus, has improved reliability. Another embodiment of the present invention may provide a liquid crystal display having an improved reliability. Additional advantages and features of embodiments of the present invention are set forth in part in the description which follows and in part will become apparent to those having ordinary skill in the art upon examination of the following.

In one embodiment, a backlight assembly is provided, according to an embodiment of the present invention, which includes a light guide plate guiding light; a lamp unit positioned on one side of the light guide plate, and including first and second lamps extending in parallel to each other in one direction, and a first holder having a body fixing the first and second lamps and a projection part projected from the body and between the first and second lamps; and a lower receptacle accommodating the light guide plate and the lamp unit therein.

In another embodiment of the present invention, there is provided a liquid crystal display, which includes a backlight assembly; and a liquid crystal panel positioned on an upper part of the backlight assembly to display an image; wherein the backlight assembly includes a light guide plate guiding light; a lamp unit positioned on one side of the light guide plate, and including first and second lamps extending in parallel to each other in one direction, and a first holder having a body fixing the first and second lamps and a projection part projected from the body and between the first and second lamps; and a lower receptacle accommodating the light guide plate and the lamp unit therein.

BRIEF DESCRIPTION OF THE DRAWINGS

The above and other objects, features, and advantages of embodiments of the present invention will be more apparent from the following detailed description taken in conjunction with the accompanying drawings, in which.

DETAILED DESCRIPTION

Figure 1:
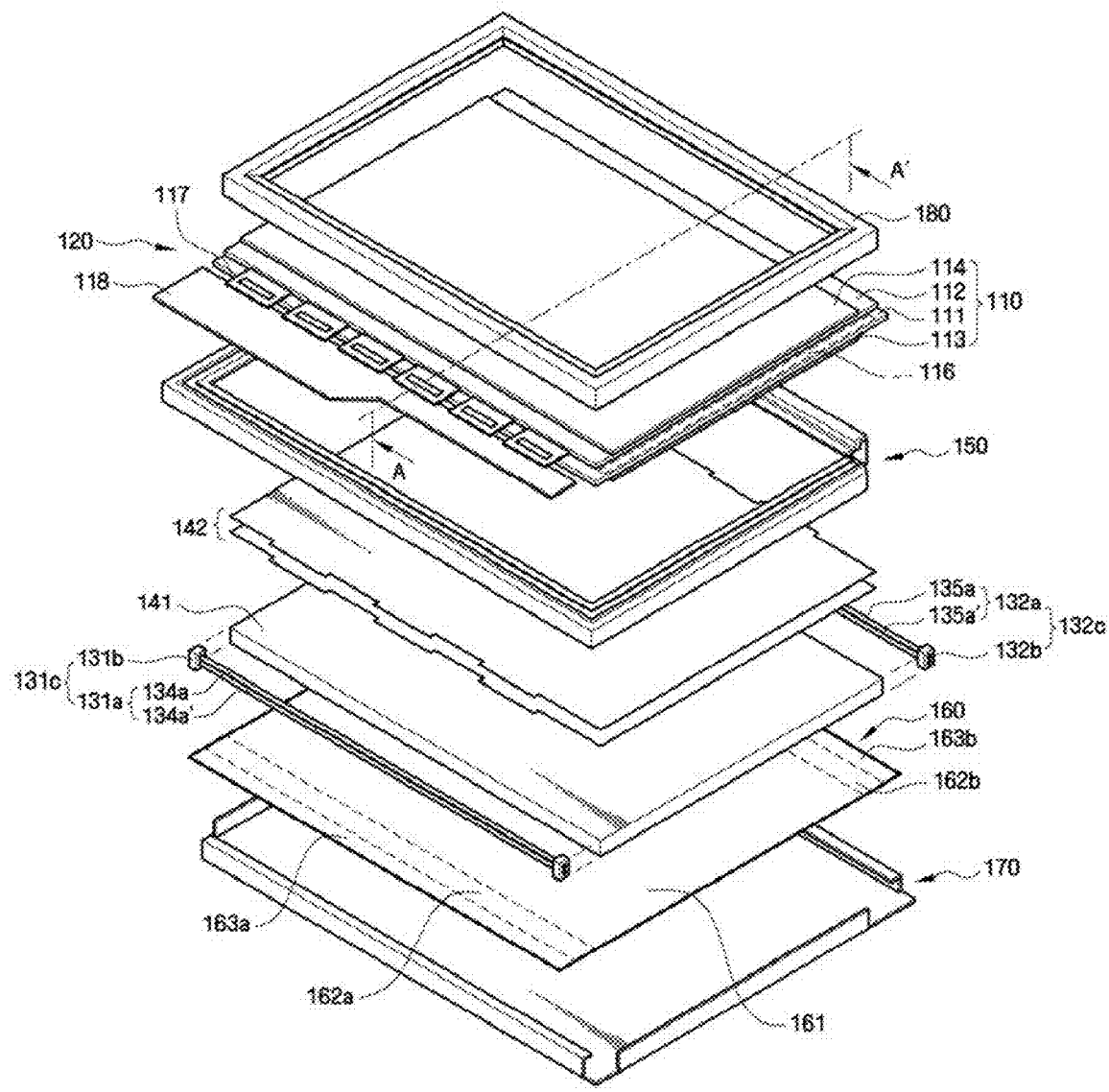
FIG. 1 is an exploded perspective view of a liquid crystal display, in accordance with an embodiment of the present invention.

Hereinafter, embodiments of the present invention will be described in detail with reference to the accompanying drawings. The aspects and features of embodiments of the present invention and methods for achieving the aspects and features will be apparent by referring to embodiments described herein with reference to the drawings. However, embodiments of the present invention should not be limited to the disclosed embodiments herein, but may be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In reference to the description of the present invention, the same drawing reference numerals are used for the same elements across various figures.

In various aspects, spatially relative wordings "below", "beneath", "lower", "above", "upper", and so forth, as shown in the drawings, may be used to facilitate the description of relationships between an element or constituent elements and another element or other constituent elements. The spatially relative wordings should be understood as wordings that include different directions of the element in use or operation in addition to the direction shown in the drawings. For example, if an element shown in the drawing is stated reversely, the element described to be "below" or "beneath" another element may be put "above" the another element. Accordingly, the exemplary wording "below" may include both directions corresponding to "below" and "above". An element may be aligned in a different direction, and thus the spatially relative wordings may be interpreted according to the alignment of the element.

In the following description of embodiments of the present invention, the terms used are for explaining embodiments of the present invention, but do not limit the scope of the present invention. In various aspects of the description, a singular expression may include a plural expression unless specially described. The term "comprises" and/or "comprising" used in the description means that one or more other components, steps, operation and/or existence or addition of elements are not excluded in addition to the described components, steps, operation and/or elements.

Unless specially defined, all terms (including technical and scientific terms) used in the description could be used as meanings commonly understood by those ordinary skilled in the art to which the present invention belongs. In addition, terms that are generally used but are not defined in the dictionary are not interpreted ideally or excessively unless they have been clearly and specially defined.

Figure 2:
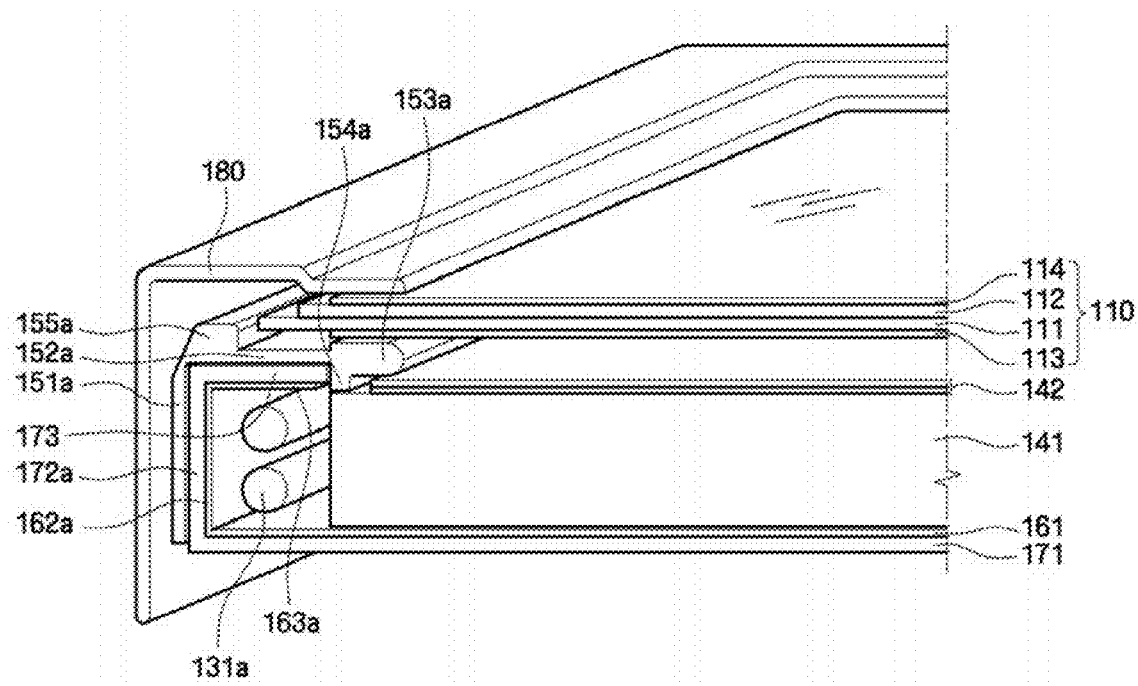
FIG. 2 is a sectional view illustrating one side of the liquid crystal display, taken along line A-A' of FIG. 1, in accordance with an embodiment of the present invention.
Figure 3:
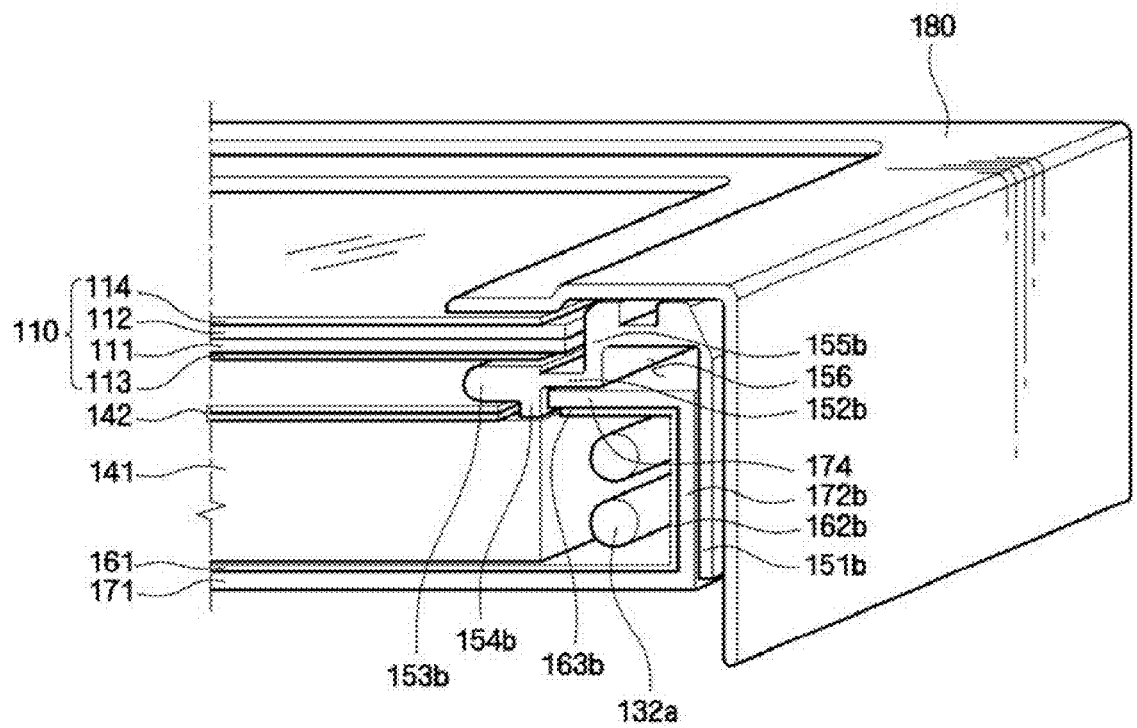
FIG. 3 is a sectional view illustrating the other side of the liquid crystal display, taken along line A-A' of FIG. 1, in accordance with an embodiment of the present invention.

In reference to FIGS. 1 to 3, a backlight assembly and a liquid crystal display (LCD), in accordance with an embodiment of the present invention will be described. FIG. 1 is an exploded perspective view of a liquid crystal display, in accordance with an embodiment of the present invention. FIG. 2 is a sectional view illustrating one side of the liquid crystal display, taken along line A-A' of FIG. 1, in accordance with an embodiment of the present invention. FIG. 3 is a sectional view illustrating the other side of the liquid crystal display, taken along line A-A' of FIG. 1, in accordance with an embodiment of the present invention. In one aspect, it should be appreciated that the wording "horizontal direction" used in the description may refer to a direction parallel to the long side of the LCD, and a "vertical direction" may refer to a direction parallel to the short side of the LCD.

Referring to FIGS. 1 to 3, the LCD includes a liquid crystal panel assembly 120 and a backlight assembly. The liquid crystal panel assembly 120 includes a liquid crystal panel 110 having a first substrate 111, a second substrate 112, and polarization plates 113 and 114 arranged on surfaces of the first and second substrates; liquid crystals (not shown); a gate drive IC 116; a data tape carrier package 117; and a printed circuit board 118.

The liquid crystal panel 110 includes the first substrate 111 having gate lines (not shown), data lines (not shown), pixel electrodes, and the like; the second substrate 112 having black matrices, color filters, common electrodes, and the like, and arranged to face the first substrate 111; the polarization plate 113 arranged on a lower part of the first substrate 111; and the polarization plate 114 arranged on an upper part of the second substrate 112. The color filters or the common electrodes may be arranged on the first substrate 111 in accordance with a type of liquid crystal panel 110. The liquid crystal panel 110, which includes the above-described flat plate type laminated substrates, is arranged in an intermediate receptacle 150.

The gate drive IC 116 is integrated and formed on the first substrate 111, and is connected to the respective gate lines (not shown). The data tape carrier package 117 is connected to the respective data lines (not shown) formed on the first substrate 111.

On a printed circuit board (PCB) 118, various drive components for inputting a gate drive signal to the gate drive Integrated circuit (IC) 116 and inputting a data drive signal to the data tape carrier package 117 may be packaged. On the other hand, the backlight assembly includes lamp units 131c and 132c, a light guide plate 141, optical sheets 142, reflection sheets 160, a lower receptacle 170, and the intermediate receptacle 150.

In one embodiment of the present invention, the lamp units 131c and 132c include lamp parts 131a and 132b and first holders 131b and 132b, respectively. In this instance, the lamp parts 131a and 132a may comprise first and second lamps 134a, 134a', 135a, and 135a' extending in parallel to each other in one direction, or the lamp parts 131a and 132a may comprise more lamps than the first and second lamps 134a, 134a', 135a, and 135a'. The first holders 131b and 132b include a body fixing the first and second lamps 134a, 134a', 135a, and 135a' of the lamp parts 131a and 132a and a projection part projected from the body and between the first and second lamps 134a, 134a', 135a, and 135a'. Positional relationships and shapes of the first holders 131b and 132b are described in greater detail herein.

The lamp units 131c and 32c, according to an embodiment of the present invention, which may be of an edge type, are arranged on one side of the LCD in a horizontal direction. The lamps 134a, 134a', 135a, and 135a' included in the lamp units 131c and 132c may be, for example, cold cathode fluorescent lamps (CCFL), external electrode fluorescent lamps (EEFL), and the like. The lamp units 131c and 132c may be in the form of line light sources and may be arranged parallel to the horizontal direction of the LCD. Specifically, the light sources 131a and 132a may be arranged on both sides of the light guide plate 141 to provide light to the light guide plate 141. On the other hand, although not shown in the drawings, the lamp units 131c and 132c are electrically connected to an inverter (not shown) for supplying a power to receive the power. The lamp units 131c and 132c and the light guide plate 141 are accommodated in the lower receptacle 170. To efficiently guide light, the light guide plate 141 may be made of a light transmitting material, for example, acrylic resin, such as PMMA (Poly-Methyl-Meth-Acrylate), and/or a material having a constant refractive index, such as PC (Poly-Carbonate).

The light incident to one side surface of the light guide plate 141 made of the above-described material has an angle not exceeding a threshold angle of the light guide plate 141, and thus, it is transmitted inside the light guide plate 141. If the light is incident to an upper surface or a lower surface of the light guide plate 141, the angle of the light exceeds the threshold angle. Accordingly, the light is not emitted to an outside of the light guide plate 141, but is uniformly transmitted inside the light guide plate 141. On either of upper and lower surfaces of the light guide plate 141, for example, on the lower surface thereof, a scattering pattern (not shown) may be formed to emit the guided light to an upper part thereof.

More than one optical sheet 142 is arranged on the upper surface of the light guide plate 141 and serves to diffuse and condense the light being transmitted from the light guide plate 141. The optical sheets 142 may include a diffusion sheet, a prism sheet, a protection sheet, and the like. The diffusion sheet is positioned between the light guide plate 141 and the prism sheet, and the diffusion sheet disperses the light incident from the light guide plate 141 to prevent the light from being partially concentrated. The prism sheet may have an array of triangular prisms formed on one surface thereof and serve to condense the light diffused from the diffusion sheet in a direction perpendicular to the liquid crystal panel 110. The protection sheet may be formed on the prism sheet, protect the surface of the prism sheet, and diffuse the light to make the distribution of the light uniform. The optical sheets 142 and the light guide plate 141 are fixed by pressure by the intermediate receptacle 150.

The intermediate receptacle 150 includes intermediate receptacle side walls 151a and 151b that engage with lower receptacle side walls 172a, 172b, 172c, and 172d. The intermediate receptacle 150 includes supports 152a and 152b bent from the intermediate receptacle side walls 151a and 151b and placed on lower receptacle upper plates 173 and 174. The intermediate receptacle 150 includes fixtures 153a and 153b extending from the supports 152a and 152b to overlap the light guide plate 141 and fixing the light guide plate 141 by pressure. Specifically, in one aspect, the fixtures 153a and 153b fix by pressure edges of upper surfaces of the light guide plate 141.

The intermediate receptacle 150, in one embodiment, may be in the form of a rectangular frame that generally includes four intermediate receptacle side walls 151a and 151b and supports 152a and 152b. The intermediate receptacle side walls 151a and 151b may be engaged with the lower receptacle side walls 172a and 172b, respectively. The supports 152a and 152b are bent from the intermediate receptacle side walls 151a and 151b to a center part of the frame, and particularly, the supports 152a and 152b, which are parallel in a horizontal direction, are placed on the lower receptacle upper plates 173 and 174. That is, in the intermediate receptacle 150, the intermediate receptacle side walls 151a and 151b and the fixtures 153a and 153b, for example, may be "Γ"-shaped. At least one of the supports 152a and 152b, for example, may be bent to be "⊏"-shaped so that a wire arrangement groove 156 is formed between the support 152a or 152b and the lower receptacle upper plate 173 or 174.

The fixtures 153a and 153b are formed to extend from the supports 152a and 152b to the light guide plate 141, i.e., to the frame-shaped center part. Lower parts of the fixtures 153a and 153b may be formed to be thicker than those of the supports 152a and 152b so that the fixtures 153a and 153b fix the optical sheets 142 and the light guide plate 141 by pressure. On the upper parts of the fixtures 153a and 153b, the liquid crystal panel 110 is placed. That is, the liquid crystal panel 110 is separated from the optical sheets 142 by the fixtures 153a and 153b of the intermediate receptacle 150.

On connection parts between the intermediate receptacle side walls 151a and 151b and the supports 152a and 152b, liquid crystal panel support portions 155a and 155b, which extend from the supports 152a and 152b to the upper parts to prevent the secession and movement of the liquid crystal panel 110, are formed. In the case where the wire arrangement groove 156 is formed, the outer wall of the wire arrangement groove 156 serves as the liquid crystal panel support portions 155a and 155b.

The intermediate receptacle 150, for example, may be a plastic mold frame to prevent the damage of components fixed by the intermediate receptacle 150. The reflection sheets 160, for example, may be made of PET (Poly-Ethylene Terephthalate) and have the reflexibility. The surface of one side of the reflection sheet 160 may be coated by a diffusion layer containing titanium dioxide.

The reflection sheets 160 are arranged to surround the lower surface of the light guide plate 141 and the lamp units 131c and 132c, and the reflection sheets 160 reflect the light emitted to the lower part of the light guide plate 141 and the side surface of the lower receptacle 170 to the upper part thereof. Specifically, the non-reflected light is again reflected to a light-emitting surface of the light guide plate 141 by a fine dot pattern formed on the rear surface of the light guide plate 141, and thus, a loss of light may be reduced.

The reflection sheets 160 are attached to the lower receptacle 170 using a double-faced tape, for example, to cover the bottom plate 171 of the lower receptacle 170, the lower receptacle side walls 172a and 172b, and the lower receptacle upper plates 173 and 174. Specifically, the reflection sheets 160 include a bottom sheet 161 arranged on the bottom plate 171 of the lower receptacle 170 and the lower part of the light guide plate 141, and the reflection sheets 160 include lamp cover sheets 162a, 162b, 163a, and 163b reflecting light emitted from the lamp units 131c and 132c arranged on both sides of the light guide plate 141. In this case, the reflection sheets 160, according to an embodiment of the present invention, may include the bottom sheet 161 and the lamp cover sheets 162a, 162b, 163a, and 163b, which are formed in a body, and this facilitates the assembling of the reflection sheets 160 on the lower receptacle 170.

In a modification of an embodiment of the present invention, the reflection sheets 160 are laminated on the bottom plate 171 of the lower receptacle 170, the lower receptacle side walls 172a and 172b, and the lower receptacle upper plates 173 and 174. The upper receptacle 180 is arranged on the upper part of the liquid crystal panel 110 to cover the upper surface of the liquid crystal panel 110 received in the lower receptacle, and the upper receptacle 180 is engaged with the lower receptacle 170. On the upper surface of the upper receptacle 180, a window for exposing the liquid crystal panel 110 to an outside is formed.

The upper receptacle 180 is engaged with the lower receptacle 170 through a hook engagement (not shown) and/or a screw engagement (not shown). The upper receptacle 180 and the lower receptacle 170 may be engaged with each other in diverse forms. In one aspect, the lower receptacle is made of a metallic material to secure the intensity and ground capability against an external impact.

The lower receptacle 170 includes the bottom plate 171 on which the light guide plate 141 and the lamp units 131c and 132c are placed. The lower receptacle 170 includes the lower receptacle side walls 172a and 172b extending in a direction substantially perpendicular to the bottom plate 171 to surround the bottom plate 171. The lower receptacle 170 includes the lower receptacle upper plates 173 and 174 bent from the lower receptacle side walls 172a and 172b to surround the lamp units 131c and 132c without overlapping the light guide plate 141. In an embodiment of the present invention, the bottom plate 171, the lower receptacle side walls 172a and 172b, and the lower receptacle upper plates 173 and 174 of the lower receptacle 170 are formed in a body.

In one embodiment, the edge of the bottom plate 171, the lower receptacle side walls 172a and 172b, and the lower receptacle upper plates 173 and 174 are bent to be "⊏"-shaped to cover the lamp units 131c and 132c. On the other hand, a separate cover (not shown) may be installed to cover the lamp units 131c and 132c.

Figure 4:
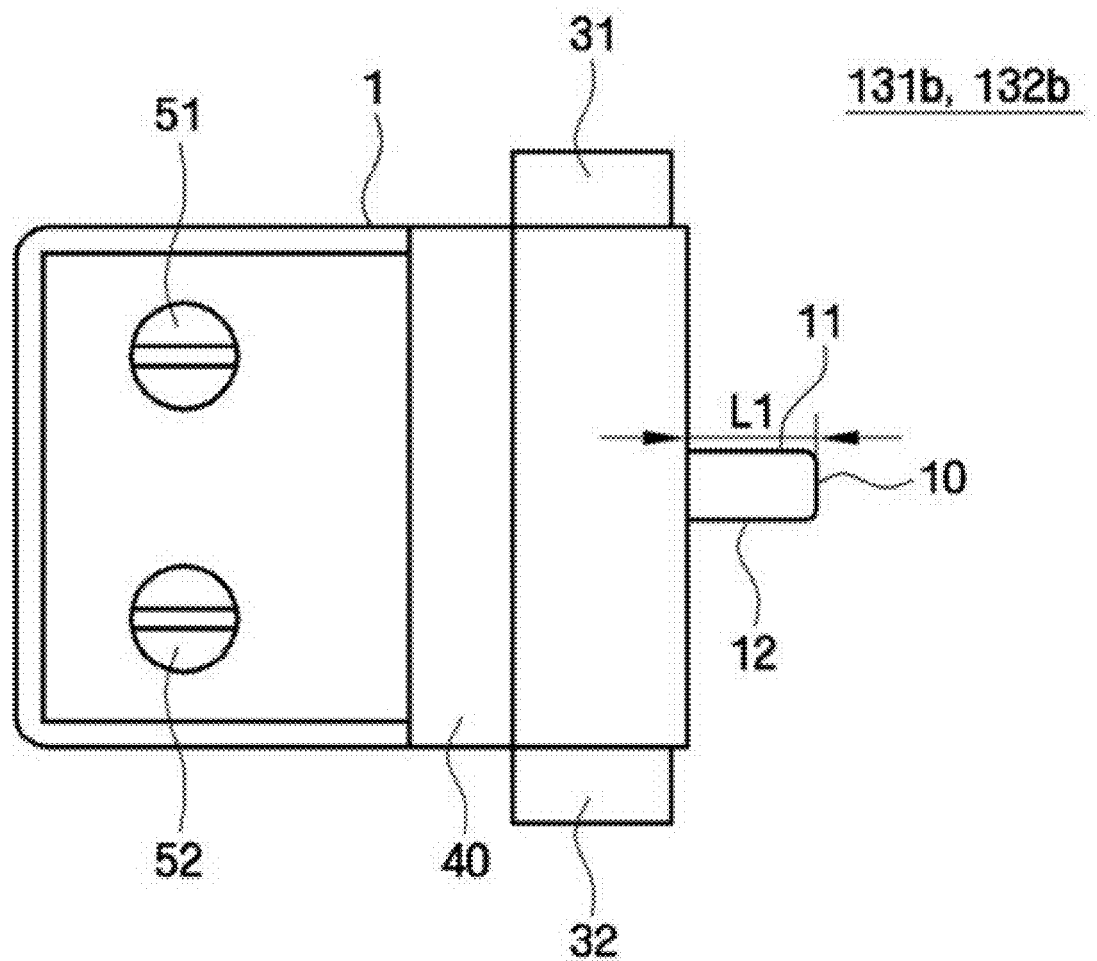
FIG. 4 is a side view of a first holder, in accordance with an embodiment of the present invention.
Figure 5:
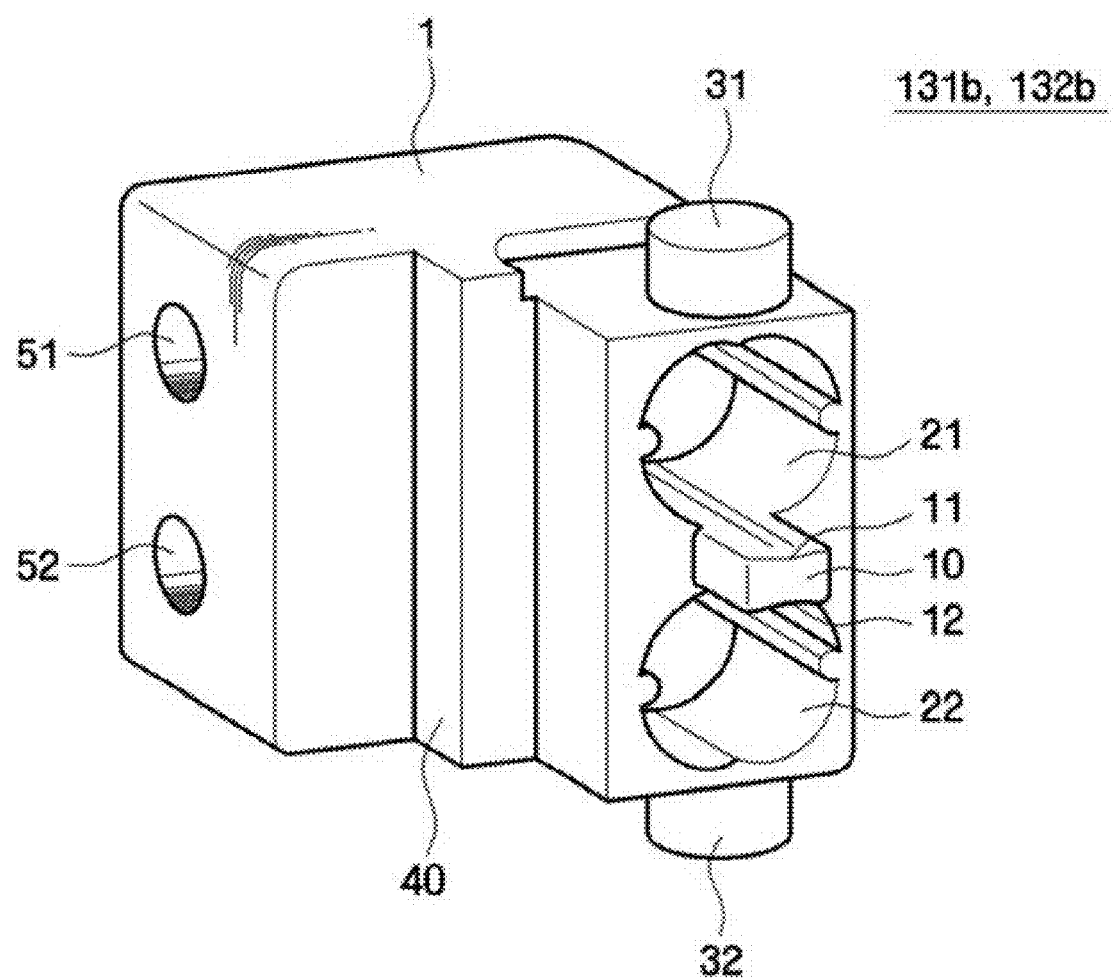
FIG. 5 is a perspective view of the first holder of FIG. 4, in accordance with an embodiment of the present invention.
Figure 6:
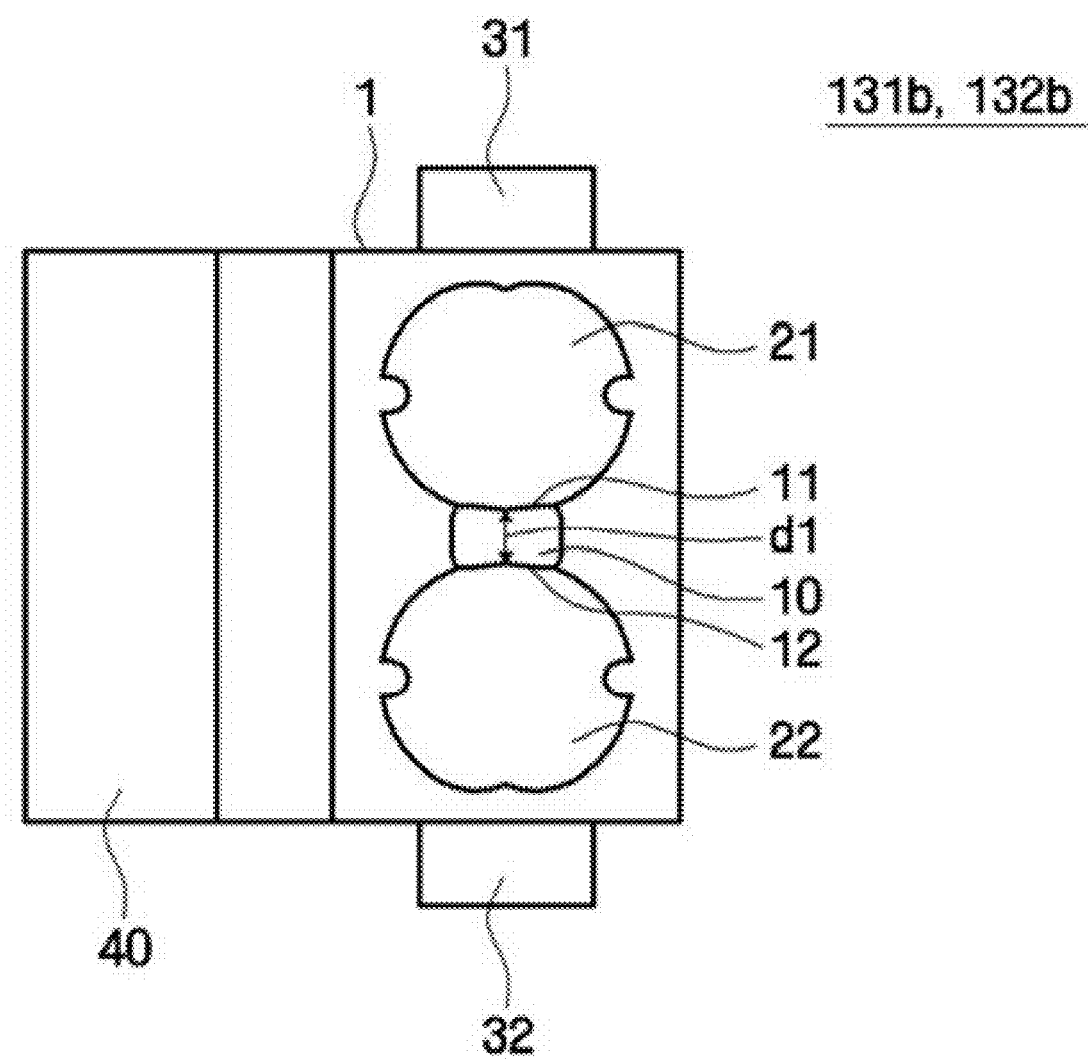
FIG. 6 is a front view of the first holder of FIG. 5, in accordance with an embodiment of the present invention.
Figure 7:
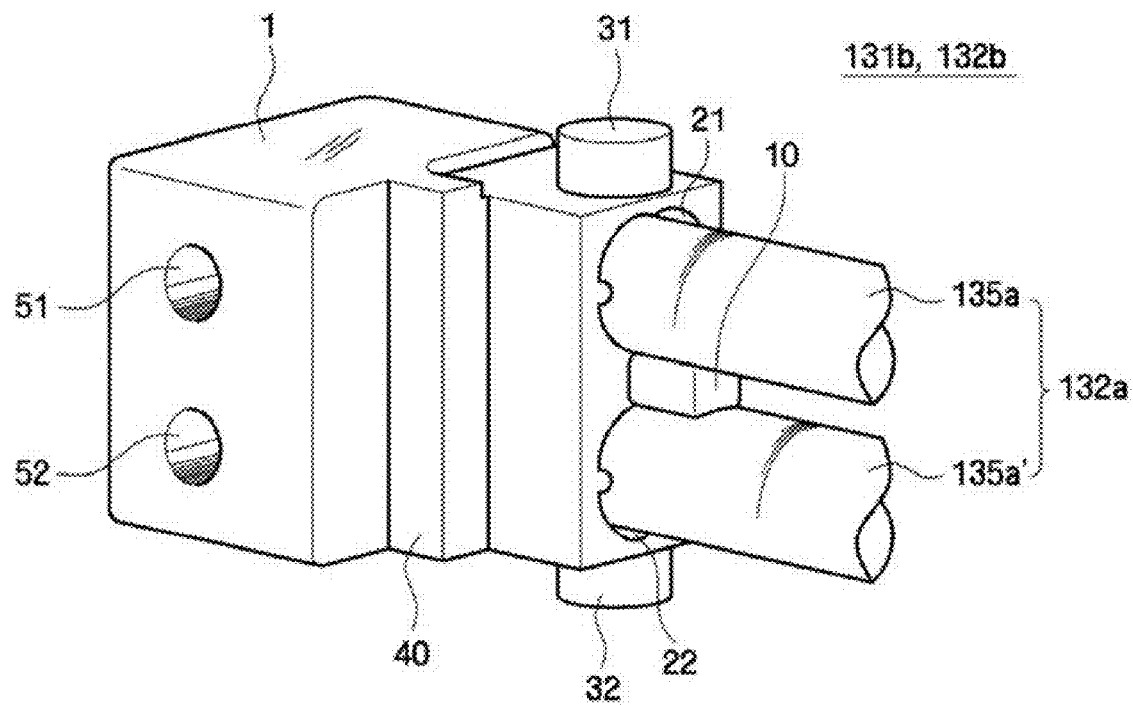
FIG. 7 is a schematic view illustrating the first holder of FIG. 5 and a lamp in a combined state, in accordance with an embodiment of the present invention.

Hereinafter, with reference to FIGS. 4 to 7, a first holder of a lamp unit, according to an embodiment of the present invention, will be described. FIG. 4 is a side view of a first holder, according to an embodiment of the present invention. FIG. 5 is a perspective view of the first holder of FIG. 4, and FIG. 6 is a front view of the first holder of FIG. 5, according to an embodiment of the present invention. FIG. 7 is a schematic view illustrating the first holder of FIG. 5 and a lamp in a combined state, according to an embodiment of the present invention.

Referring to FIGS. 1 and 4-7, first holders 131b and 132b include a body 1 fixing the first and second lamps 134a, 134a', 135a, and 135a' of the lamp parts 131a and 132a, and the first holders 131b and 132b include a projection part 10 projected from the body 1 and between the first and second lamps 134a, 134a', 135a, and 135a'. The body 1 includes first and second insertion grooves 21 and 22, fixing projections 31 and 32, a light guide plate guide part 40, and wire drawing parts 51 and 52.

The first and second insertion grooves 21 and 22 are adapted to fix the first and second lamps 134a, 134a', 135a, and 135a' of the lamp parts 131a and 132a to the body 1 of the first holders 131b and 132b. In this case, the number of first and second insertion grooves may be determined corresponding to the number of lamps in the lamp parts 131a and 132a.

The fixing projections 31 and 32 are fixed to the lower receptacle 170 through the first holders 131b and 132b. The fixing projections 31 and 32 are formed on upper and lower surfaces of the body 1 of the first holders 131b and 132b. An engagement part (not shown) is formed in a position of the lower receptacle 170 that corresponds to the fixing projections 31 and 32, and the engagement part is engaged with the fixing projections 31 and 32.

In one embodiment, the light guide plate guide part 40 is formed to prevent the light guide plate 141 from being pushed to the lamp parts 131a and 132a. Lead wires (not shown) formed in end parts of the lamp parts 131a and 132a are electrically connected to lamp wires (not shown) in the first holders 131b and 132b, and the lamp wires, which are electrically connected to the lead wires of the lamp parts 131a and 132a, are drawn out to an outside through the wire drawing parts 51 and 52.

The projection part 10 is projected from the body 1 and between the first and second lamps 134a, 134a', 135a, and 135a'. In this case, the projection part 10 is projected in parallel to and in a length direction of the first and second lamps 134a, 134a', 135a, and 135a'. Also, the projection part 10 is positioned between the first and second insertion grooves 21 and 22. Accordingly, the first and second lamps 134a, 134a', 135a, and 135a' are maintained at regular intervals.

The projection part 10 includes a first contact part 11 contacting the first lamps 134a and 135a, or a second contact part 12 contacting the second lamps 134a' and 135a'. In this case, the first and second contact parts 11 and 12 may have the same shape as the first and second lamps 134a, 134a', 135a, and 135a'. That is, if the shape of the first and second lamps 134a, 134a', 135a, and 135a' is circular, the first and second contact parts 11 and 12 also have the circular shape so that they completely overlap the first and second lamps 134a, 134a', 135a, and 135a'. Accordingly, the first and second lamps 134a, 134a', 135a, and 135a' can be safely placed on the projection part 10. In this case, the space between the first and second lamps 134a, 134a', 135a, and 135a' may be the distance d1 between the first and second contact parts 11 and 12.

Accordingly, the space between the first and second lamps 134a, 134a', 135a, and 135a', which is provided to prevent the performance deterioration due to the interaction between the first and second lamps 134a, 134a', 135a, and 135a', may be set by adjusting the distance between the first and second contact parts 11 and 12 of the projection part 10. In other words, by forming the projection 10 on the first holders 131b and 132b, the space between the first and second lamps 134a, 134a', 135a, and 135a' may be regularly maintained, and the performance deterioration due to the interaction between the first and second lamps 134a, 134a', 135a, and 135a' may be prevented.

On the other hand, the ratio of the length d1 of the projection part 10 to the length of the first and second lamps 134a, 134a', 135a, and 135a' may be in the range of $1/1000$ to $1/300$. Here, if the ratio of the length d1 of the projection part 10 to the length of the first and second lamps 134a, 134a', 135a, and 135a' is less than $1/1000$, it is not effective in regularly maintaining the space between the first and second lamps 134a, 134a', 135a, and 135a'.

In one aspect, if the ratio of the length d1 of the projection part 10 to the length of the first and second lamps 134a, 134a', 135a, and 135a' exceeds $1/300$, the projection part 10 may intercept a part of light provided from the first and second lamps 134a, 134a', 135a, and 135a', and this may cause the whole luminance of the LCD to deteriorate.

On the other hand, a discharge gas for generating light is filled in the first and second lamps 134a, 134a', 135a, and 135a'. The discharge gas may include rare gas, such as argon (Ar) gas, neon (Ne) gas, xenon (Xe) gas, and the like, or gas mixtures including argon (Ar) gas, neon (Ne) gas, xenon (Xe) gas, and the like, and a specified amount of mercury (Hg). The mercury (Hg) existing in the first and second lamps 134a, 134a', 135a, and 135a' is in liquid state at room temperature. Accordingly, the movement of the mercury (Hg) is limited in comparison to argon (Ar), neon (Ne), and the like, existing in gas state. Particularly, since in a space having the lowest temperature in the first and second lamps 134a, 134a', 135a, and 135a', the evaporation of the mercury (Hg) is relatively restrained and the coagulation of thereof is expedited, a phenomenon that the evaporated mercury (Hg) is agglomerated (hereinafter referred to as "mercury (Hg) agglomeration phenomenon") occurs. The mercury (Hg) agglomeration phenomenon may occur in a partial space having the lowest temperature in the first and second lamps 134a, 134a', 135a, and 135a'. Particularly, if the mercury (Hg) agglomeration phenomenon occurs in an isolated space in the first and second lamps 134a, 134a', 135a, and 135a', the agglomerated mercury (Hg) cannot move to another space to cause the occurrence of invalid mercury (Hg), and with the lapse of time, valid mercury (Hg) is exhausted to cause the occurrence of lamp inferiority. In this case, since an outside area of electrodes of the first and second lamps 134a, 134a', 135a, and 135a' positioned relatively apart from the center part of the first and second lamps 134a, 134a', 135a, and 135a' corresponds to the isolated space in the lamps, the mercury (Hg) agglomeration phenomenon occurring in the space may cause the lamp inferiority.

Accordingly, to prevent the mercury (Hg) agglomeration phenomenon from occurring in the isolated space in the first and second lamps 134a, 134a', 135a, and 135a', it is required to lead the mercury (Hg) agglomeration to the center part of the first and second lamps 134a, 134a', 135a, and 135a'. On the other hand, the heat of the lamps may be emitted in a point where the first and second lamps 134a, 134a', 135a, and 135a' become in contact with an external object, it is possible to make the temperature of the lamps minimum in this point and to lead the mercury (Hg) agglomeration phenomenon.

On the other hand, in an embodiment of the present invention, the projection part 10 is formed to project in a direction of the center part of the first and second lamps 134a, 134a', 135a, and 135a' and to contact the first and second lamps 134a, 134a', 135a, and 135a'. Accordingly, it is possible to make the temperature of the first and second lamps 134a, 134a', 135a, and 135a' minimum in the point where the lamps are in contact with the projection part 10 and to lead the mercury (Hg) agglomeration phenomenon to occur in the space in the first and second lamps 134a, 134a', 135a, and 135a' that overlap the outside of the first and second lamps 134a, 134a', 135a, and 135a' contacting the projection part 10. That is, by leading the mercury agglomeration phenomenon to the center part rather than the isolated space in the first and second lamps 134a, 134a', 135a, and 135a' by the projection part 10, the occurrence of invalid mercury (Hg), as well as the lamp inferiority, may be prevented.

Figure 8:
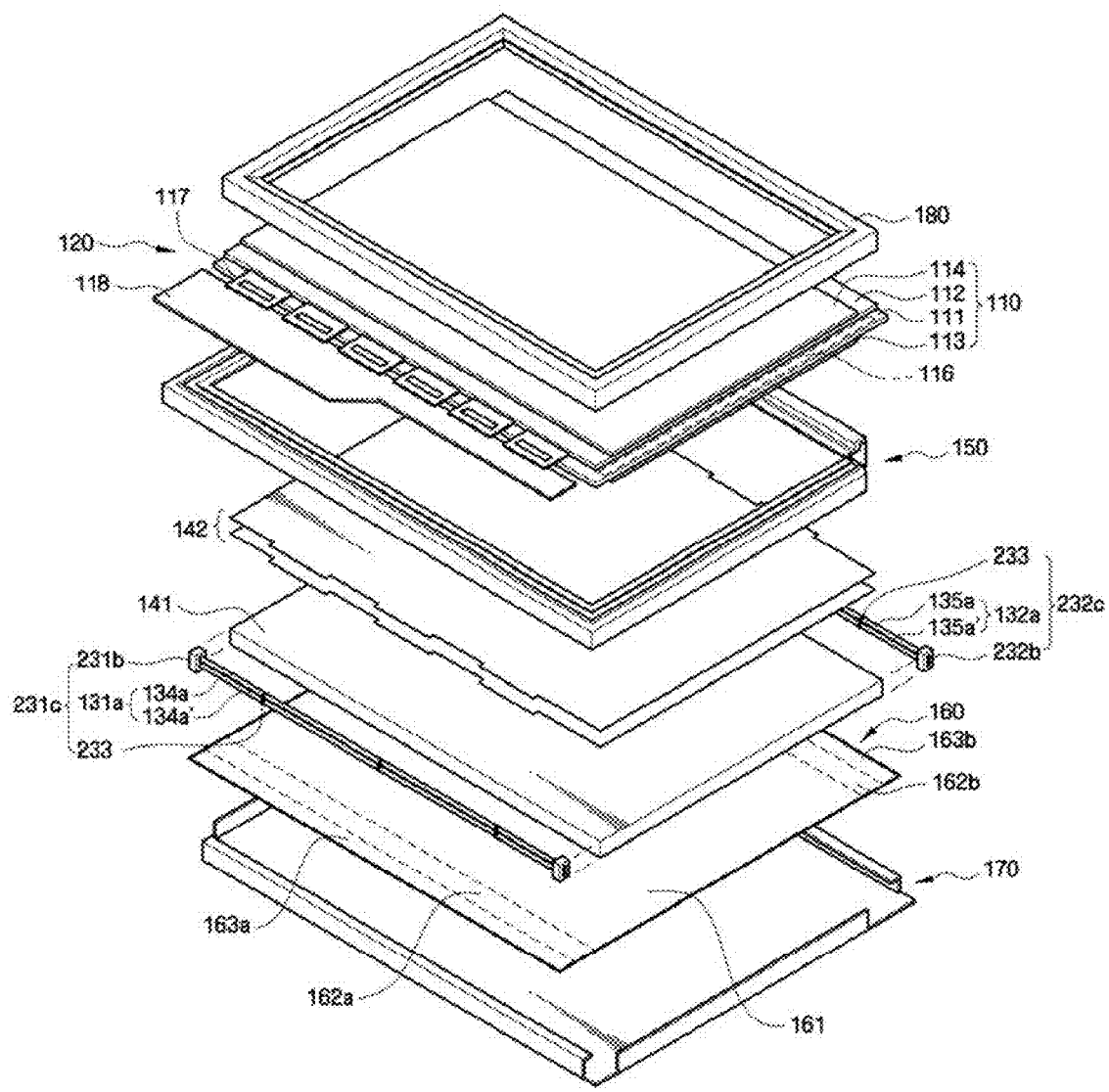
FIG. 8 is an exploded perspective view of a liquid crystal display, in accordance with another embodiment of the present invention.

The first holders 131b and 132b may be formed of a silicon material. Hereinafter, with reference to FIG. 8, a backlight assembly and a LCD, according to another embodiment of the present invention, will be described in detail. In another embodiment of the present invention, the same drawing reference numerals are used for the same elements as those according to an embodiment of the present invention, and for convenience in explanation, the duplicate description of the corresponding elements will be excluded. Referring to FIG. 8, the LCD roughly includes a liquid crystal panel assembly 120 and a backlight assembly.

The backlight assembly includes lamp units 231c and 232c, a light guide plate 141, optical sheets 142, reflection sheets 160, a lower receptacle 170, and an intermediate receptacle 150. The lamp units 231c and 232c include lamp parts 131a and 132b and a first holder 233, and second holders 231b and 232b, respectively. In this case, the lamp parts 131a and 132a may be composed of first and second lamps 134a, 134a', 135a, and 135a' extending in parallel to each other in one direction, or lamps more than the first and second lamps. The first holder 233 includes a body 2 fixing the first and second lamps 134a, 134a', 135a, and 135a' of the lamp parts 131a and 132a, and projection parts 13a and 13b projected from the body 2 and between the first and second lamps 134a, 134a', 135a, and 135a'. Positional relation and shape of the first holder 233 is described in greater detail herein.

On the other hand, the lamp units 231c and 232c may include a body fixing the first and second lamps 134a, 134a', 135a, and 135a' of the lamp parts 131a and 132a, and second holders 231b and 232b including projection parts projected from the body and between the first and second lamps 134a, 134a', 135a, and 135a'. In this case, in the body of the second holders 231b and 232b, first and second insertion grooves fixing the first and second lamps 134a, 134a', 135a, and 135a' may be included. It should be appreciated that, since the detailed shape and function of the second holders, according to another embodiment of the present invention, are substantially the same as those of the first holders 131b and 132b, duplicate description thereof will be omitted.

Figure 9:
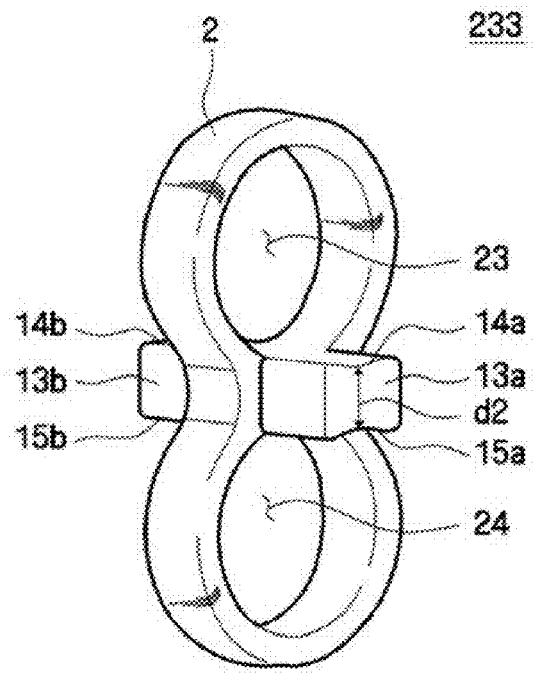
FIG. 9 is a perspective view of a first holder according to an embodiment of the present invention.
Figure 10:
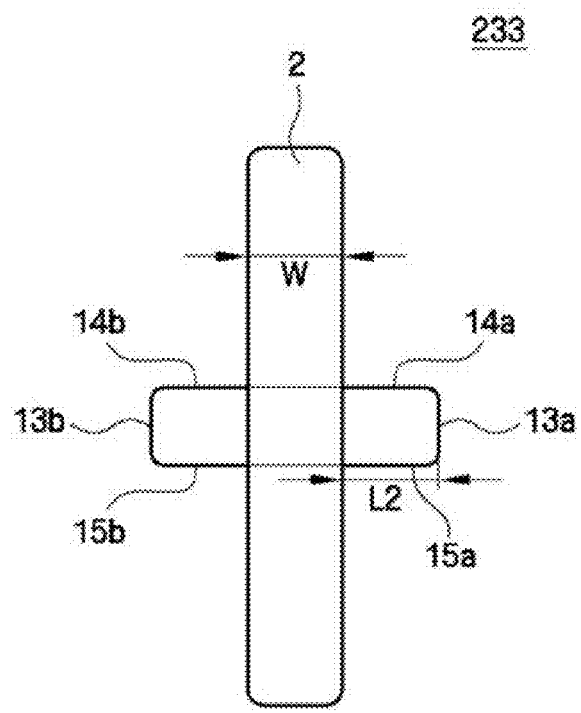
FIG. 10 is a side view of the first holder of FIG. 9, in accordance with an embodiment of the present invention.
Figure 11:
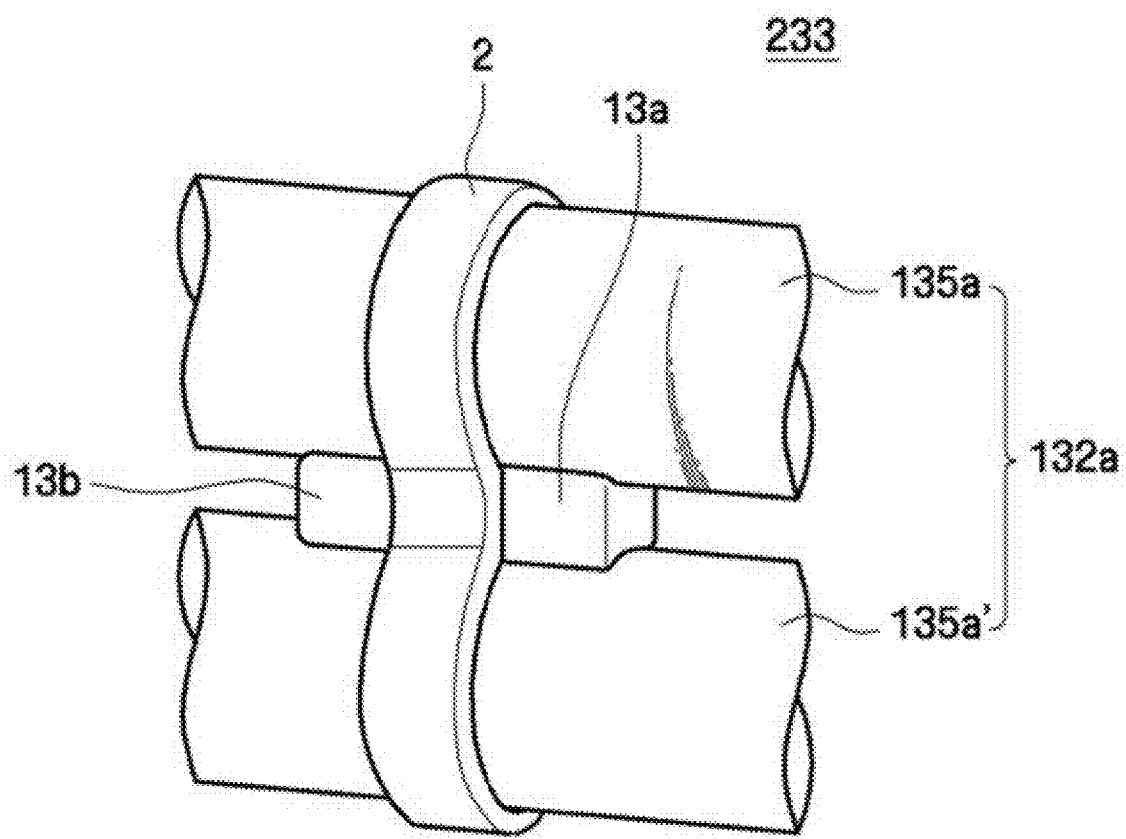
FIG. 11 is a schematic view illustrating the first holder of FIG. 9 and a lamp in a combined state, in accordance with an embodiment of the present invention.
Figure 12:
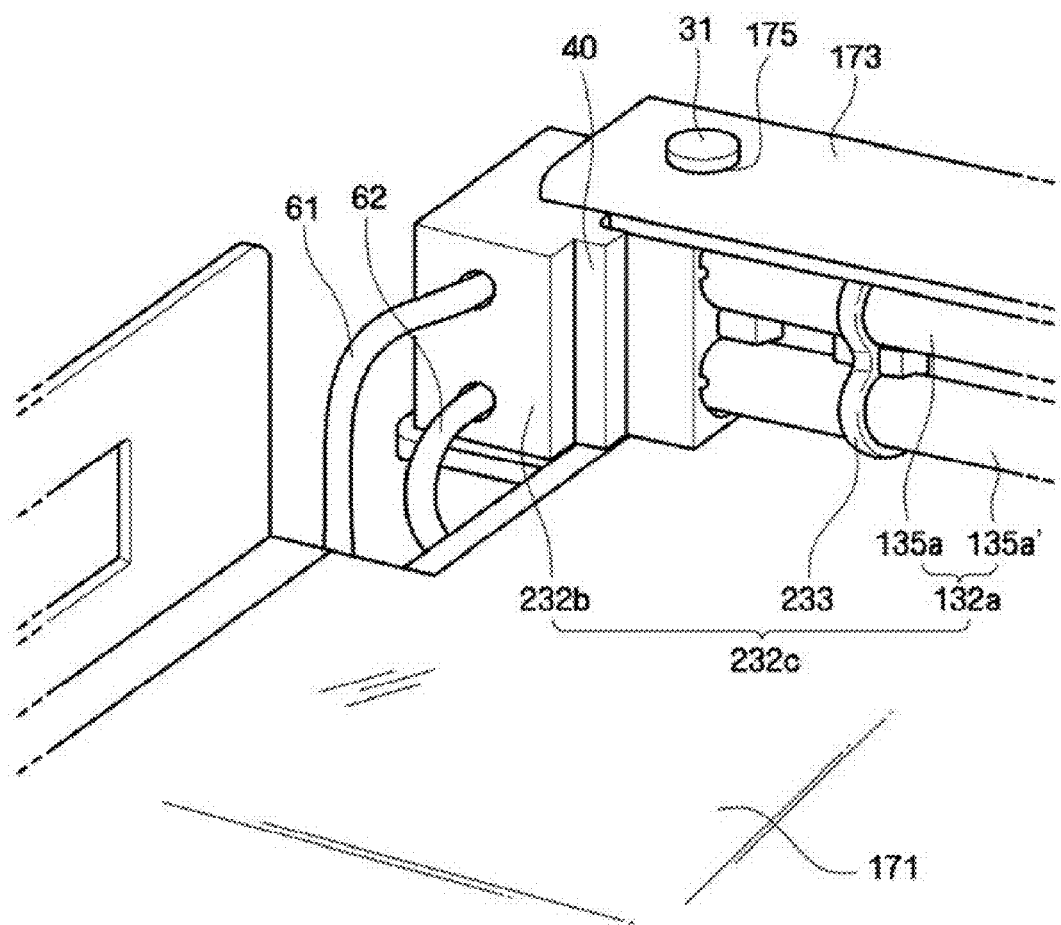
FIG. 12 is a perspective view illustrating in detail a lamp unit, in accordance with another embodiment of the present invention.

In reference to FIGS. 9 to 12, a first holder of a lamp unit, according to another embodiment of the present invention, will be described. FIG. 9 is a perspective view of a first holder, according to an embodiment of the present invention. FIG. 10 is a side view of the first holder of FIG. 9, according to an embodiment of the present invention. FIG. 11 is a schematic view showing the first holder of FIG. 9 and a lamp in a combined state, according to an embodiment of the present invention. FIG. 12 is a perspective view showing a lamp unit, according to another embodiment of the present invention.

Referring to FIGS. 8 to 12, a first holder 233 includes a body 2 fixing the first and second lamps 134a, 134a', 135a, and 135a' of the lamp parts 131a and 132a, and the first holder 233 includes projection parts 13a and 13b projected from the body 2 and between the first and second lamps 134a, 134a', 135a, and 135a'. The body 2 includes first and second through-holes 23 and 24 penetrating the first and second lamps 134a, 134a', 135a, and 135a'. The number of first and second through-holes 23 and 24 may be set corresponding to the number of lamps of the lamp parts 131a and 132a. The first and second lamps 134a, 134a', 135a, and 135a' of the lamp parts 131a and 132a pass through the through-holes 23 and 24 in a length direction thereof. In this case, the first and second lamps 134a, 134a', 135a, and 135a' become in contact with the body 2 in the first and second though-holes 23 and 24. As such, the first and second lamps 134a, 134a', 135a, and 135a' are fixed to the first holder 233.

The first and second through-holes 23 and 24 may have the same shape as the first and second lamps 134a, 134a', 135a, and 135a' so that the first and second lamps 134a, 134a', 135a, and 135a' are in effective contact with the body 2 in the first and second through-holes 23 and 24. On the other hand, the ratio of the width (See "W" in FIG. 10) of the surface, on which the body 2 contacts the first and second lamps 134a, 134a', 135a, and 135a', to the length of the first and second lamps 134a, 134a', 135a, and 135a' may be in the range of $1/1000$ to $1/300$.

Here, in one aspect, if the ratio of the width W of the contact surface to the length of the first and second lamps 134a, 134a', 135a, and 135a' is less than $1/1000$, it is not effective in regularly maintaining the space between the first and second lamps 134a, 134a', 135a, and 135a', and it is difficult that the first holder 233 is arranged in a proper position between the first and second lamps 134a, 134a', 135a, and 135a'. If the ratio of the width of the contact surface to the length of the first and second lamps 134a, 134a', 135a, and 135a' exceeds $1/300$, the body 2 may intercept a part of light provided from the first and second lamps 134a, 134a', 135a, and 135a', and this may cause the whole luminance of the LCD to deteriorate.

The projection parts 13a and 13b are projected from the body 2 and between the first and second lamps 134a, 134a', 135a, and 135a'. In this case, the projection parts 13a and 13b are projected in parallel to and in a length direction of the first and second lamps 134a, 134a', 135a, and 135a'. Also, the projection parts 13a and 13b are positioned between the first and second through-holes 23 and 24. Accordingly, the first and second lamps 134a, 134a', 135a, and 135a' are maintained at regular intervals. On the other hand, the projection parts 13a and 13b may be positioned on both sides between the first and second through-holes 23 and 24. Accordingly, the space between the first and second lamps 134a, 134a', 135a, and 135a' may be maintained more effectively. Since the shape and function of the projection parts 13a and 13b, according to another embodiment of the present invention, are substantially the same as those of the projection part 10, the duplicate description thereof will be omitted.

Referring to FIG. 12, in the lamp units 231c and 232c, according to another embodiment of the present invention, a plurality of first holders 233 may be arranged at regular intervals. Also, the second holder is adapted to regularly maintain the space between the first and second lamps 134a, 134a', 135a, and 135a'. In one aspect, the space between the first and second lamps 134a, 134a', 135a, and 135a' may be regularly maintained without being affected by the external environment in which the LCD is used. Accordingly, the performance deterioration of the LCD, which may be caused by the irregular space between the first and second lamps 134a, 134a', 135a, and 135a', may be prevented to improve the reliability of the LCD.

Although embodiments of the present invention have been described for illustrative purposes, those skilled in the art will appreciate that various modifications, additions, and substitutions are possible, without departing from the scope and spirit of the present invention as disclosed in the accompanying claims.

What is claimed is:

1. A backlight assembly comprising:
a light guide plate adapted to guide light; and
a lamp unit positioned on one side of the light guide plate, the lamp unit including first and second lamps extending parallel to each other in a first direction, the lamp unit including a first holder having a body fixing the first and second lamps and a projection part projecting from the body and between the first and second lamps,
wherein a ratio of a length of the projection part to a length of the first or second lamp is in a range of $1/1000$ to $1/300$.

2. The backlight assembly of claim 1, wherein the projection part is projecting parallel to and in a length direction of the first and second lamps.

3. The backlight assembly of claim 1, wherein the projection part includes a first contact part contacting the first lamp and a second contact part contacting the second lamp, and wherein the first and second contact parts have a same shape as the first and second lamps.

4. The backlight assembly of claim 3, wherein a space between the first lamp and the second lamp corresponds to a distance between the first contact part and the second contact part.

5. The backlight assembly of claim 1, wherein the body includes first and second insertion grooves formed thereon to fix the first and second lamps, respectively.

6. The backlight assembly of claim 5, wherein the projection part is positioned between the first insertion groove and the second insertion groove.

7. The backlight assembly of claim 1, wherein the body includes first and second through-holes formed thereon that are penetrated by the first and second lamps, respectively.

8. The backlight assembly of claim 7, wherein the projection part is positioned between the first through-hole and the second through-hole.

9. The backlight assembly of claim 7, wherein the first and second through-holes have a same shape as the first and second lamps.

10. The backlight assembly of claim 7, wherein a ratio of a width of a surface, on which the body contacts the first and second lamps, to a length of the first or second lamp is in a range of $1/1000$ to $1/300$.

11. The backlight assembly of claim 7, wherein the lamp unit comprises a second holder having a body fixing the first and second lamps, the second holder having a projection part projecting from the body of the second holder and between the first and second lamps, and wherein the body of the second holder includes first and second insertion grooves formed thereon to fix the first and second lamps, respectively.

12. The backlight assembly of claim 1, the backlight assembly further comprises a lower receptacle accommodating the light guide plate and the lamp unit therein,
wherein the lower receptacle includes a bottom plate, side walls, and an upper plate, and wherein the side walls and the upper plate surround the lamp unit.

13. The backlight assembly of claim 12, wherein the first holder is engaged with the upper plate.

14. The backlight assembly of claim 12, wherein the bottom plate, the side walls, and the upper plate are formed in a body.

15. A liquid crystal display comprising:
a backlight assembly; and
a liquid crystal panel positioned on an upper part of the backlight assembly to display an image;
wherein the backlight assembly includes:
a light guide plate adapted to guide light; and
a lamp unit positioned on one side of the light guide plate, the lamp unit including first and second lamps extending parallel to each other in a first direction, the lamp unit including a first holder having a body fixing the first and second lamps and a projection part projecting from the body and between the first and second lamps,
wherein a ratio of a length of the projection part to a length of the first or second lamp is in a range of $1/1000$ to $1/300$.

16. The liquid crystal display of claim 15, wherein the projection part is projecting in parallel to and in a length direction of the first and second lamps.

17. The liquid crystal display of claim 15, wherein the body includes first and second insertion grooves formed thereon to fix the first and second lamps, respectively.

18. The liquid crystal display of claim 15, wherein the body includes first and second through-holes formed thereon that are penetrated by the first and second lamps, respectively.

19. The liquid crystal display of claim 18, wherein the lamp unit comprises a second holder having a body fixing the first and second lamps, the second holder having a projection part projecting from the body of the second holder and between the first and second lamps, and wherein the body of the second holder includes first and second insertion grooves formed thereon to fix the first and second lamps, respectively.

* * * * *